United States Patent
Yamagami et al.

(10) Patent No.: US 6,748,998 B2
(45) Date of Patent: Jun. 15, 2004

(54) OPENING/CLOSING DEVICE AND PARTITIONING SYSTEM FOR MANUFACTURING MACHINE

(75) Inventors: Takatoshi Yamagami, Inazawa (JP); Masahiro Nagata, Inazawa (JP); Mitsuaki Nakata, Tokyo-to (JP); Zenichi Koide, Tokyto-to (JP)

(73) Assignee: Inaryo Technica Co., Ltd. (JP)

( * ) Notice: Subject to any disclaimer, the term of this patent is extended or adjusted under 35 U.S.C. 154(b) by 0 days.

(21) Appl. No.: 10/140,705

(22) Filed: May 8, 2002

(65) Prior Publication Data

US 2002/0170689 A1 Nov. 21, 2002

(30) Foreign Application Priority Data

May 15, 2001 (JP) .................................... 2001-145497

(51) Int. Cl.[7] .............................................. E05D 15/06
(52) U.S. Cl. ........................ 160/201; 160/117; 160/118
(58) Field of Search ................................ 160/115, 117, 160/118, 159, 201, 207, 214

(56) References Cited

U.S. PATENT DOCUMENTS

| | | | | |
|---|---|---|---|---|
| 3,577,679 A | * | 5/1971 | Petterborg | 49/127 |
| 4,088,157 A | * | 5/1978 | Chen et al. | 139/1 R |
| 4,390,054 A | * | 6/1983 | Niibori et al. | 160/265 |
| 4,407,541 A | * | 10/1983 | Boots | 296/216 |
| 4,522,345 A | * | 6/1985 | Pilboue | 242/55 |
| 4,662,420 A | * | 5/1987 | Hirao | 160/32 |
| 4,997,022 A | * | 3/1991 | Klein | 160/265 |
| 5,450,929 A | * | 9/1995 | Ohgita et al. | 187/244 |
| 5,551,744 A | * | 9/1996 | Liao | 296/97.4 |
| 6,000,246 A | * | 12/1999 | Hsieh et al. | 66/151 |
| 6,530,414 B2 | * | 3/2003 | Mayr et al. | 160/98 |
| 2002/0053411 A1 | * | 5/2002 | Mochizuki | 160/201 |
| 2002/0066231 A1 | * | 6/2002 | Hormann | 49/197 |
| 2002/0157797 A1 | * | 10/2002 | Mullet | 160/201 |
| 2002/0162634 A1 | * | 11/2002 | Dorma | 160/201 |

FOREIGN PATENT DOCUMENTS

| | | | | |
|---|---|---|---|---|
| DE | 4003218 | * | 8/1991 | 160/201 X |
| GB | 2236492 | * | 4/1991 | 160/201 X |

OTHER PUBLICATIONS

KOBA "Advanced Laser Technology for High Productivity" catalog.
FPL–6 "Laser Work Center" catalog.
BYLAS "The Laser Cutting System for Large Oversized Sheetmetal" catalog.
Prima Industrie "Die Lasermaschinen" catalog.
TRUMPF CNC catalog.
Laser Machines LC–30150II Series—Amada catalog.

* cited by examiner

Primary Examiner—Bruce A. Lev
(74) Attorney, Agent, or Firm—Nields & Lemack

(57) ABSTRACT

The present invention provides an opening/closing device, comprising an opening disposed on a partitioning system, driving wheels mounted on each side of lower end of the opening, driven wheels mounted on each side of upper end of the opening, and flexible members to be run between the driving wheels and the driven wheels, wherein one end and the other end of each of the flexible members are engaged with an opening/closing panel respectively, the driving wheels on both sides are driven synchronously and the opening/closing panel is moved up and down.

7 Claims, 13 Drawing Sheets

OPENING/CLOSING DEVICE AND PARTITIONING SYSTEM FOR MANUFACTURING MACHINE

BACKGROUND OF THE INVENTION

The present invention relates to a partitioning system for enclosing a large-size manufacturing machine such as laser manufacturing machine and for forming a defined space, and the present invention also relates to an opening/closing device to be provided on an opening to the partitioning system.

In recent years, there has been progress in automation of the manufacturing machine. As a result, an operator of the manufacturing machine has now no need to operate the equipment except the work such as the operation to set the working condition on the manufacturing machine, or the work for setting an object to be manufactured. Also, it is necessary to arrange in such manner that the operator should not or cannot move closer to the manufacturing machine to ensure safety during the manufacturing operation of the manufacturing machine. For this reason, in a large-size manufacturing machine, which requires safety measures such as laser manufacturing machine, a partitioning system is installed, which encloses the manufacturing machine and defines an isolated space for the equipment from the surrounding.

The partitioning system is provided with an opening, through which an object to be manufactured is set on the manufacturing machine and the object is taken out after the manufacturing. The opening is to be opened or closed by an opening/closing device.

The partitioning system is usually installed in an air-conditioned factory. In this respect, an upper part of the partitioning system must be completely opened to maintain the effects of air-conditioning. Also, the opening/closing device must be designed in such manner as to exclude trouble in the manufacturing operation.

As a conventional type opening/closing device, a slide door of suspended type is known.

In the suspended type slide door, a guide rail stretched in a horizontal direction is disposed on an upper end of the opening, and a door body suspended from the guide rail is slid in the horizontal direction to open or close the opening of the partitioning system.

In the conventional type suspended type slide door as described above, it is necessary to install the guide rail, which runs across the upper end of the opening. The guide rail may become an obstacle in some cases when the objects to be manufactured are brought in or out of the manufacturing machine. For this reason, it has been required that the opening of the partitioning system is completely opened.

SUMMARY OF THE INVENTION

It is an object of the present invention to provide a partitioning system for a manufacturing machine and an opening/closing device, by which an opening on the partitioning system can be completely opened, and opening and closing operation can be performed quickly.

The present invention provides an opening/closing device, which comprises an opening disposed on a partitioning system, driving wheels mounted on each side of lower end of the opening, driven wheels mounted on each side of upper end of the opening, and flexible members to be run between the driving wheels and the driven wheels, wherein one end and the other end of each of the flexible members are engaged with an opening/closing panel respectively, the driving wheels on both sides are driven synchronously and the opening/closing panel is moved up and down. Also, the present invention provides an opening/closing device as described above, wherein a drive shaft is disposed on a lower end of the opening, the driving wheels are provided on the drive shaft, and the driving wheels are rotated by an opening/closing motor. Further, the present invention provides an opening/closing device as described above, wherein the driving wheels and the driven wheels are sprocket wheels and the flexible members are chains. Also, the present invention provides an opening/closing device as described above, wherein one end of the flexible member is engaged with the opening/closing panel via a tension spring. Further, the present invention provides an opening/closing device as described above, wherein the opening is opened or closed by a plurality of opening/closing panels, as many driving wheels as matching the number of the opening/closing panels are provided on each side of the drive shaft, driven wheels are disposed at positions facing to the driving wheels respectively, the opening/closing panels are moved up and down via the flexible members run between the driving wheels and the driven wheels, and each of the driving wheels is driven in such manner that a circumferential speed ratio of pitch circles of driving wheels is equalized with a ratio of amounts of moving up or down of the opening/closing panels. Also, the present invention provides an opening/closing device as described above, wherein a side pillar is erected on each side of the opening, the drive shaft is provided between both of the side pillars, the driven wheel is disposed on an upper end of each of the side pillars, a guide rail is provided on an inner side of each of the side pillars, and the opening/closing panel is moved up and down along the guide rail via guide rollers. Further, the present invention provides an opening/closing device as described above, wherein the driving wheel is fixed on the drive shaft, and the drive shaft is rotated by an opening/closing motor. Also, the present invention provides an opening/closing device as described above, wherein a pitch circle of each of the driving wheels and the driven wheels is changed for each opening/closing panel so that the flexible members do not interfere with each other. Further, the present invention provides a partitioning system, which comprises a frame member receptacle mounted on a bed of the manufacturing machine, a frame member disposed on the frame member receptacle, and a panel mounted on the frame member. Also, the present invention provides the partitioning system as described above, wherein a position of the frame member receptacle is adjusted in advance before the frame member is mounted. Further, the present invention provides the partitioning system as described above, wherein the frame member receptacle can be transported under such condition that the frame member is mounted on the bed. Also, the present invention provides the partitioning system as described above, wherein the frame member receptacle comprise a lower bracket positioned in a vertical direction, and an upper bracket mounted on the lower bracket, and wherein the upper bracket has a horizontal surface where the frame member is placed and a vertical surface positioned in a horizontal direction with respect to the bed. Further, the present invention provides the partitioning system as described above, wherein the frame member can be disassembled to a lower frame mounted on the frame member receptacle, a pillar to be erected on the lower frame, and an upper frame mounted on an upper end of the pillar. Also, the present invention provides the partitioning system as described above, wherein the pillar comprises a lower flange on a lower end and the lower flange has a vertical surface abutted and positioned to the lower frame. Further, the present invention provides the partitioning system as described above, wherein the panel comprises a hooked hardware to be engaged with the upper frame on upper end thereof. Also, the present invention provides the partitioning system as described above, wherein the panel is divided to a predetermined number of divided panel members, and the divided panel members can be connected by a square neck bolt. Further, the present invention provides the partitioning system as described above, wherein the lower frame is made of a drawn or extruded material, and the drawn or extruded material has convex shaped grooves for fixing bolts on each surface.

DETAILED DESCRIPTION OF THE PREFERRED EMBODIMENT

Figure 1:
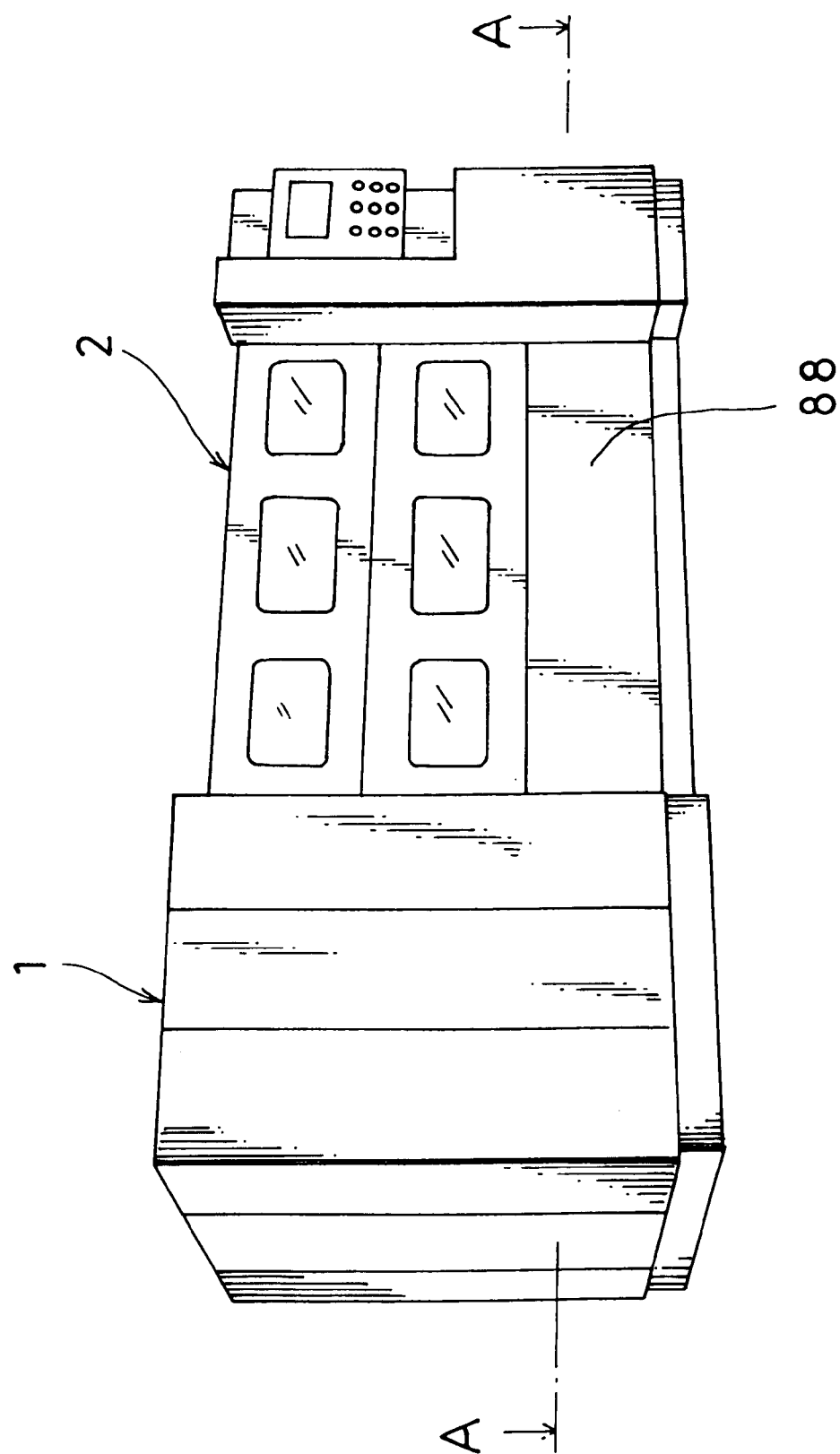
FIG. 1 is a total perspective view of an embodiment of the present invention.

Description will be given below on an embodiment of the present invention referring to the drawings.

FIG. 1 is an external view as seen from a front side of a partitioning system equipped with an opening/closing device according to the present embodiment.

First, description will be given on a wall unit 1 referring to FIG. 2 to FIG. 9.

In the figures, reference numeral 3 denotes a bed of a manufacturing machine. An upper surface of the bed 3 serves as a reference plane 4 of the manufacturing machine, where an object is set. Reference numeral 5 is an adjuster, and horizontal positioning of the reference plane 4 is performed by adjusting the adjuster 5.

Using the reference plane 4 as a reference, a frame member receptacle 6 is mounted under the reference plane at a point separated by a predetermined distance. A frame member 7 is mounted on the frame member receptacle 6, and a panel 8 is disposed on the frame member 7.

Now, description will be given on the frame member receptacle 6.

Figure 2:
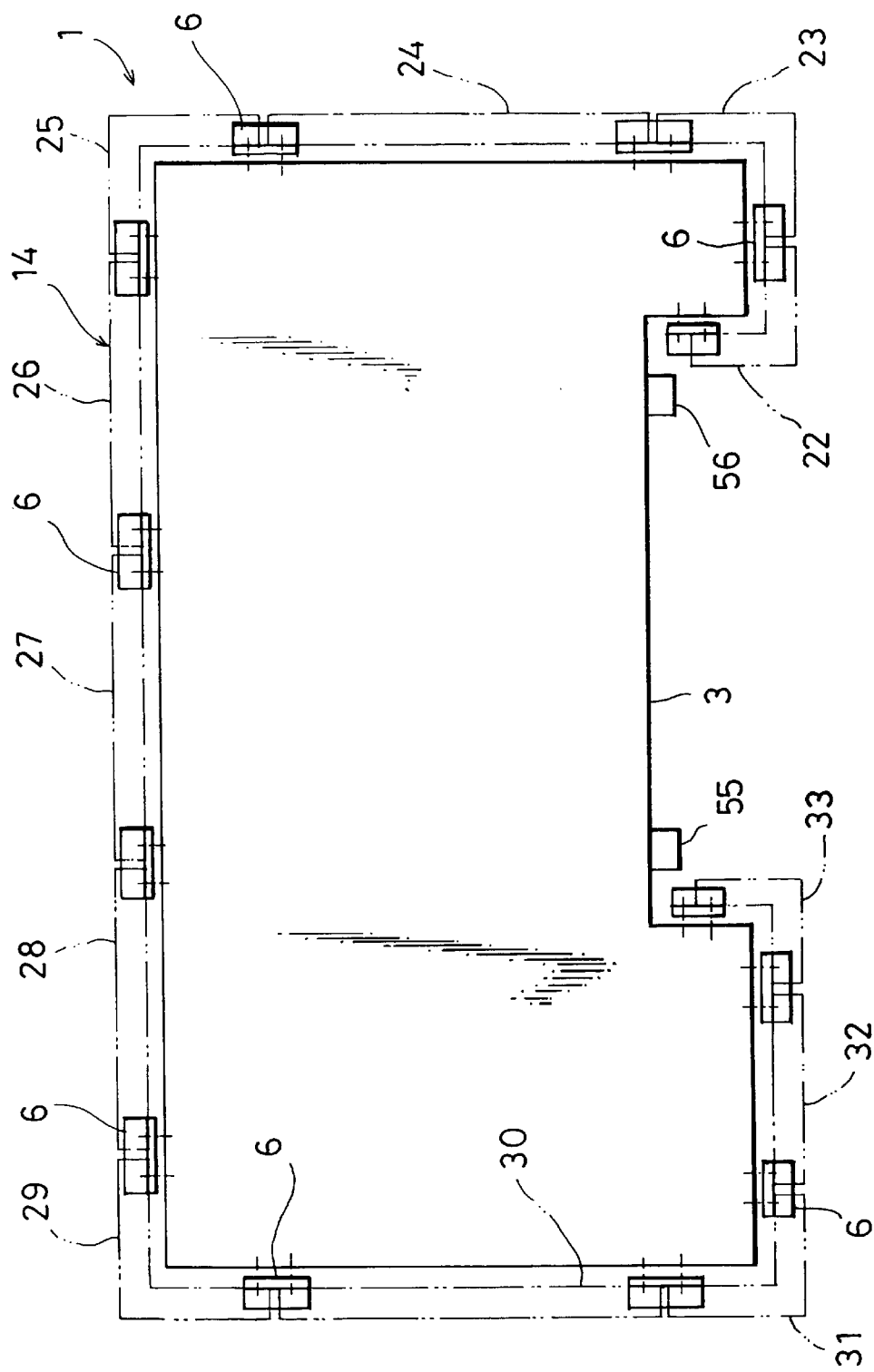
FIG. 2 is an arrow diagram along the line A—A in FIG. 1.

At a point separated by a predetermined distance under the reference plane 4, lower brackets 11 are fixed on the bed 3 by bolts 10. A predetermined number of the lower brackets 11 are provided around the bed 3 with adequate spacing (13 brackets are shown in FIG. 2). An upper surface of each of the lower brackets 11 runs in parallel to the reference plane 4, and it is set at a predetermined distance from the reference plane 4. On the upper surface of each of the lower brackets 11, an oblong hole (not shown) is formed perpendicularly to a mounting surface of the lower bracket 11.

At a point separated by a predetermined distance under the reference plane 4, stud bolts 12 are studded. On each of the lower brackets 11, an upper bracket 13 with L-shaped cross-section is placed. On a vertical surface of the upper bracket 13, through-holes 18 which the stud bolts 12 pass through are formed. Under the condition where the upper bracket 13 is placed on the lower bracket 11, the stud bolt 12 is protruded in an outward direction, and a lower frame 14 (to be described later) is fastened together the bracket 13 on the protruded portion of the stud bolt 12. Bolts 15 are fixed on the lower surface of the upper bracket 13 by welding, and the bolt 15 are passed through an oblong holes 19 on the lower bracket 11.

A fixing nut 16 and a positioning nut 17 are screwed on the stud bolt 12. By tightening the fixing nut 16, the stud bolt 12 is fixed on the bed 3. By setting the position of the positioning nut 17, the upper bracket 13 is positioned in a horizontal direction with respect to the bed 3.

With the vertical surface of the upper bracket 13 pressed against the positioning nut 17, a nut is screwed on the bolt 15, and the upper bracket 13 is fixed on the lower bracket 11.

The frame member 7 is placed on the upper bracket 13, and the frame member 7 is mounted on the frame member receptacle 6 via the stud bolt 12.

Now, the frame member 7 will be described.

The lower frame 14 is provided around the bed 3 except the portion where an opening/closing device 2 is disposed. To facilitate the handling and the transport, the lower frame 14 is divided to lower frame submembers 22, 23, 24, 25, 26, 27, 28, 29, 30, 31, 32 and 33 at required portions, specifically where the frame member receptacles 6 are installed.

Each of the low frame submembers 22, 23, 24, 25, 26, 27, 28, 29, 30, 31, 32 and 33 has a cross-section of the same form. The lower frame submembers 22, 23, 24, 25, 26, 27, 28, 29, 30, 31, 32 and 33 are fastened on the upper brackets 13 via the stud bolts 12. In the following, the lower frame submembers 22, 23, 24, 25, 26, 27, 28, 29, 30, 31, 32 and 33 are generically called as a lower frame 14 to facilitate the explanation.

The lower frame 14 is designed to have such a cross-section that it is bent at right angles at four points and the width of the upper surface is narrower than the width of the lower surface, and reinforcing plates 39 are welded with a predetermined spacing along the longitudinal direction. Because the width of the upper surface is narrower, the upper part of the protruded portion of the stud bolt 12 is opened, and this facilitates the fastening of the nut 21. The position of the upper bracket 13 is determined by the positioning nut 17. By mounting the lower frame 14 on the upper bracket 13, the position of the outer side of the lower frame 14 with respect to the bed 3 is determined. A predetermined number of pillars 34 are erected on the lower frame 14 with a predetermined spacing.

A lower flange 35 of an inverted L-shape is mounted on the lower end of the pillar 34, and an upper flange 36 in a planar shape is mounted on the upper end. By abutting the vertical surface of the lower flange 35 on the outer side surface of the lower frame 14, the position of the frame member 7 to the bed 3 is determined. The lower frame 14 is provided with screw holes or has nuts welded on the inner side, and the lower flange 35 is fixed on the lower frame 14 by bolts 37.

An upper frame 38 is placed on the upper flange 36. The upper frame 38 is divided to upper frame submembers in the same manner as the lower frame 14 so as to facilitate the handling and the transport. The dividing points are on the upper flange 36 (not shown). The panel 8 is mounted on the upper frame 38.

Description will be given below on the panel 8.

Figure 8:
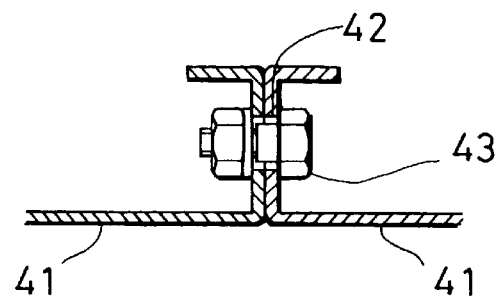
FIG. 8 is a partial view showing connecting condition of the panel main member in the present embodiment.
Figure 9:
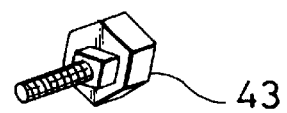
FIG. 9 is a perspective view of a bolt with rectangular base to be used for connection in the present embodiment.

Both ends of a panel main member 41 are bent in a bag-like shape as shown in FIG. 8. The panel main members 41 are abutted on each other via end surfaces 41a. A rectangular hole 42 for connection is formed on the end surface 41a. A square neck bolt 43 with a screw base having a rectangular cross-section is passed through the rectangular hole 42, and the panel main members 41 are connected by the square neck bolt 43.

Reinforcing members 44 and 45 extending in a horizontal direction are fixed on the upper end and the lower end on the inner side of the panel main member 41 respectively. A hooked hardware 46 is fixed on the reinforcing member 44, and a seating hardware 47 with a L-shaped cross-section is fixed on the reinforcing member 45. The hooked hardware 46 is engaged with the upper frame 38, and the seating hardware 47 is placed on the lower frame 14 and is fixed on the lower frame 14 via a bolt 48. A nut 49 with the bolt 48 screwed in it is welded on the inner side of the upper surface of the lower frame 14. When the plate of the lower frame 14 is thick, a screw hole is directly formed on the lower frame 14.

The hooked hardware 46 is engaged with the upper frame 38, and the panel 8 is suspended. The seating hardware 47 is placed on the lower frame 14 and is fixed on the lower frame 14 by the bolt 48. Thus, the panel 8 is mounted on the frame member 7, and the panel main members 41 are connected with each other via the square neck bolt 43.

The panel main member 41 may be designed with a frame member and a door which is installed on the frame member via a hinge so as to be opened and closed. According to this arrangement, in case of maintenance, maintenance of the manufacturing machine can be simplified by opening the door.

In the partitioning system as described above, the upper portion is completely opened, and this facilitates parts replacement in case of maintenance of the laser manufacturing machine or in case of transport of a large-size object to be manufactured.

Next, description will be given on transport of the wall unit 1 in the above arrangement and on assembling operation at a site.

First, temporary assembling of the wall unit 1 is performed prior to the shipment. By performing temporary assembling, upper and lower positions of the lower bracket 11 and a horizontal position of the upper bracket 13 are determined. The upper and the lower positions of the lower bracket 11 and the horizontal position of the upper bracket 13 may be determined according to the designed value. In such case, there is no need to perform temporary assembling.

For the transport, the frame member receptacle 6, i.e. the lower bracket 11 and the upper bracket 13, are assembled on the bed 3. The lower frame 14 and the upper frame 38 are disassembled to submembers respectively. The pillars 34 and the panel main members 41 are transported separately.

For the assembling at a site, the lower frame 14 is placed on the upper bracket 13, and the lower frame 14 is pressed against the vertical surface of the upper bracket 13 and is mounted. The pillar 34 is erected on the lower frame 14, and the pillar 34 is mounted by pressing the vertical surface of the lower flange 35 on the outer side surface of the lower frame 14. An end of the upper frame 38 is placed on the upper flange 36 on the pillar 34 and is mounted. Further, the panel main member 41 is assembled.

Working operation can be performed as follows: With the lower frame 14 placed on the upper bracket 13, with the pillar 34 being on self-erected state, with the upper frame 38 placed on the pillar 34, and with the panel main member 41 suspended from the frame member 7. Further, the position of the lower frame 14 and the position of the pillar 34 can be mechanically determined. Accordingly, this can be accomplished by a single operator without any assistant. The lower frame 14 can be mounted by simply tightening the nut 21, and the frame member 7 can be mounted by tightening the bolt 37. The procedures to mount the upper frame 38, to mount the panel main member 41, and to connect the panel main members 41 with each other can be accomplished by simply tightening the bolts respectively. The working procedure is very simple and can be performed using a simple tool such as a spanner.

If there is ample time at a site, the lower bracket 11 and the lower frame 14 may be assembled and positioned at the site. In this case, also, there is no need to erect a column, etc., on the floor surface at the site where the manufacturing machine is to be installed. Also, there is no need to adjust positional relationship between the manufacturing machine and the partitioning system, and this contributes to higher working efficiency.

Even when the place of installation of the manufacturing machine is changed, there is no further trouble and the work can be performed.

Figure 10:
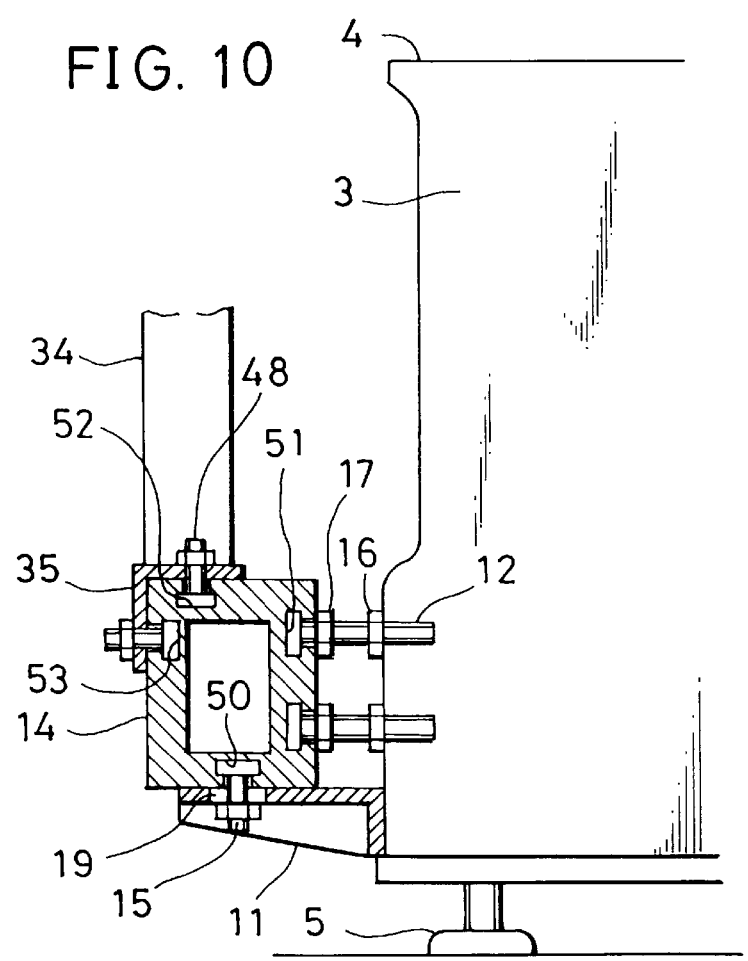
FIG. 10 is a drawing to explain another example of a lower frame in the present embodiment.
Figure 11:
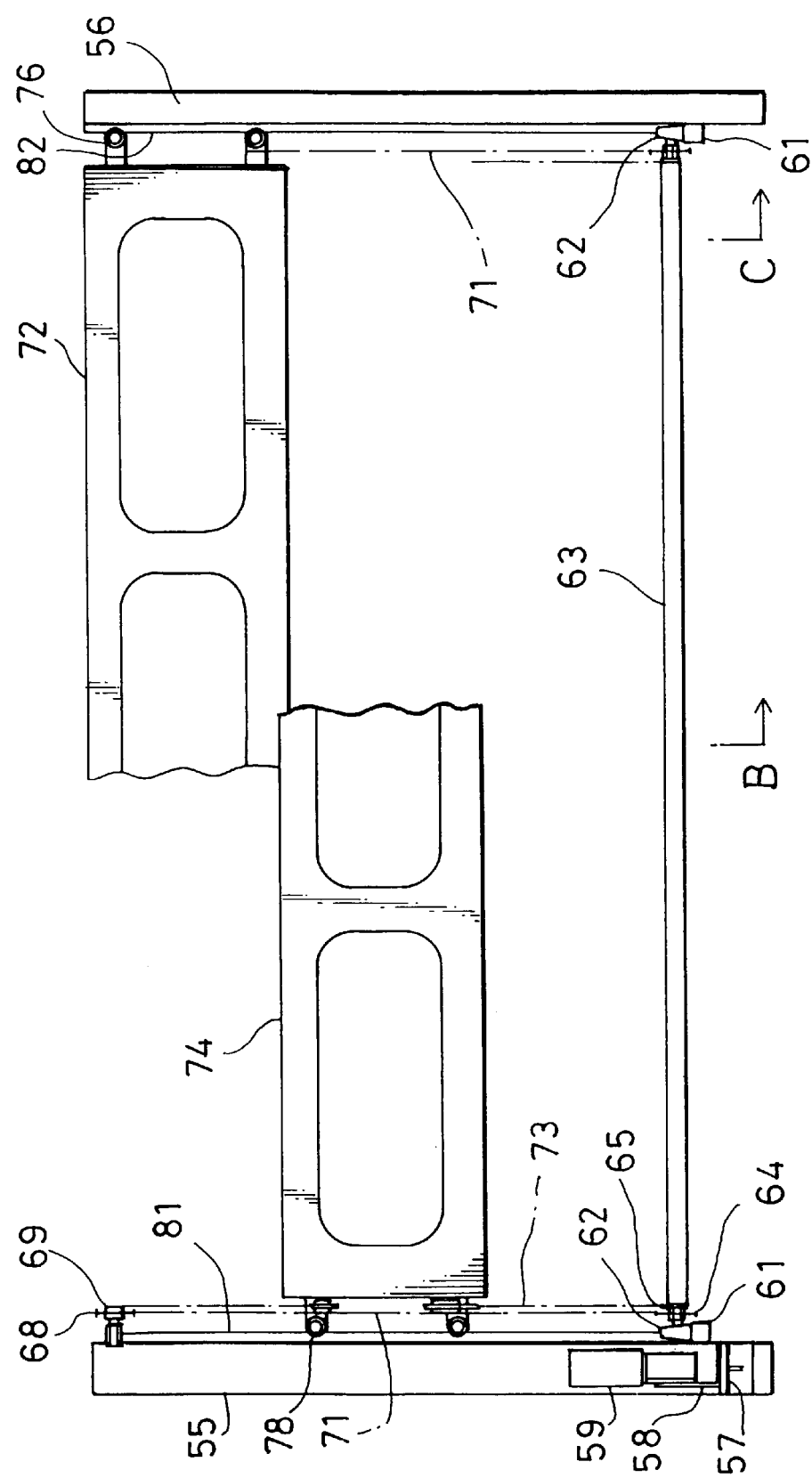
FIG. 11 is a front view of an opening/closing device in the present embodiment.

FIG. 10 shows a variation example of a member used in the above embodiment.

Figure 3:
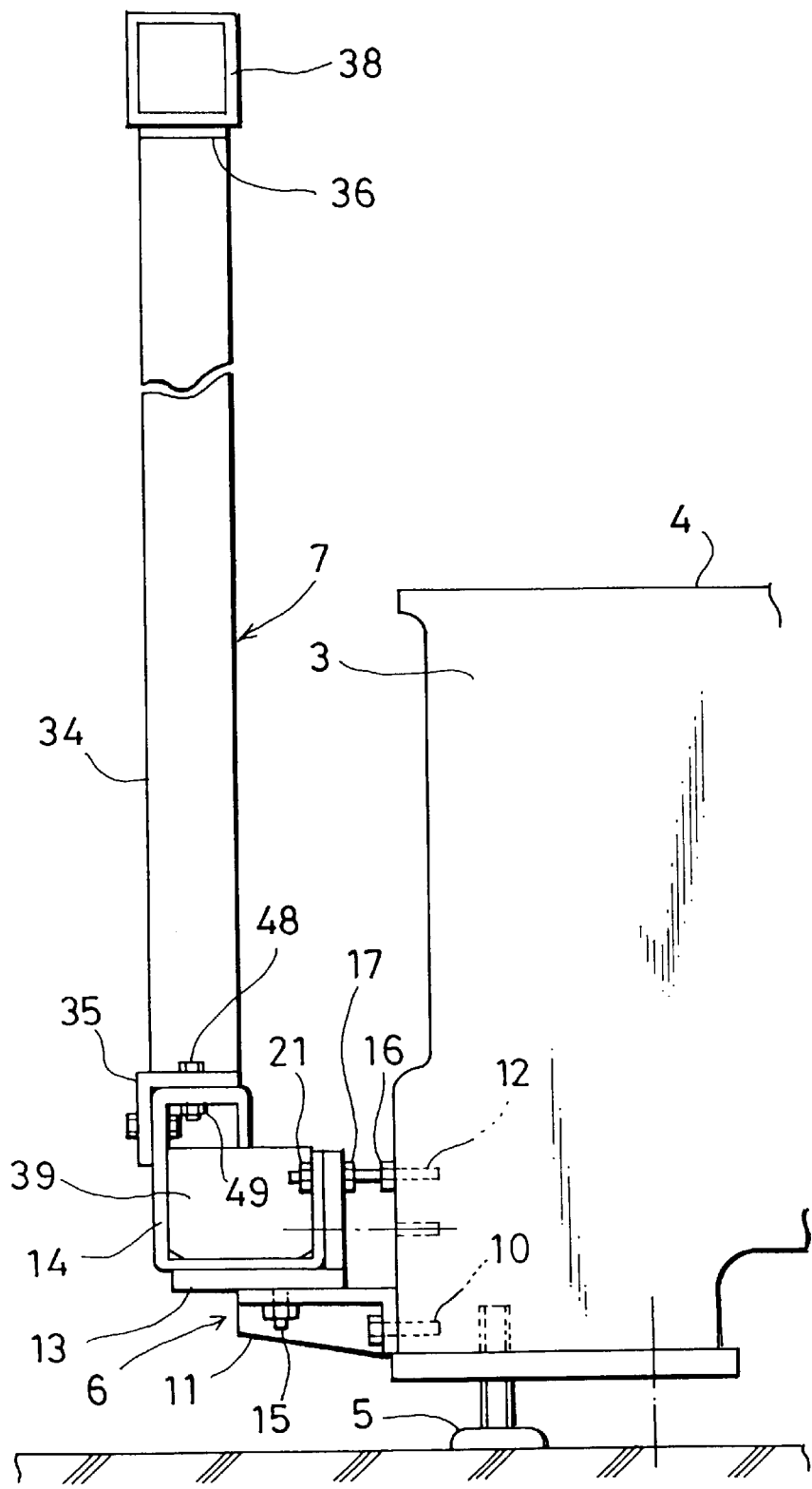
FIG. 3 is a partial side view showing relationship between a bed and a frame member in the present embodiment.
Figure 4:
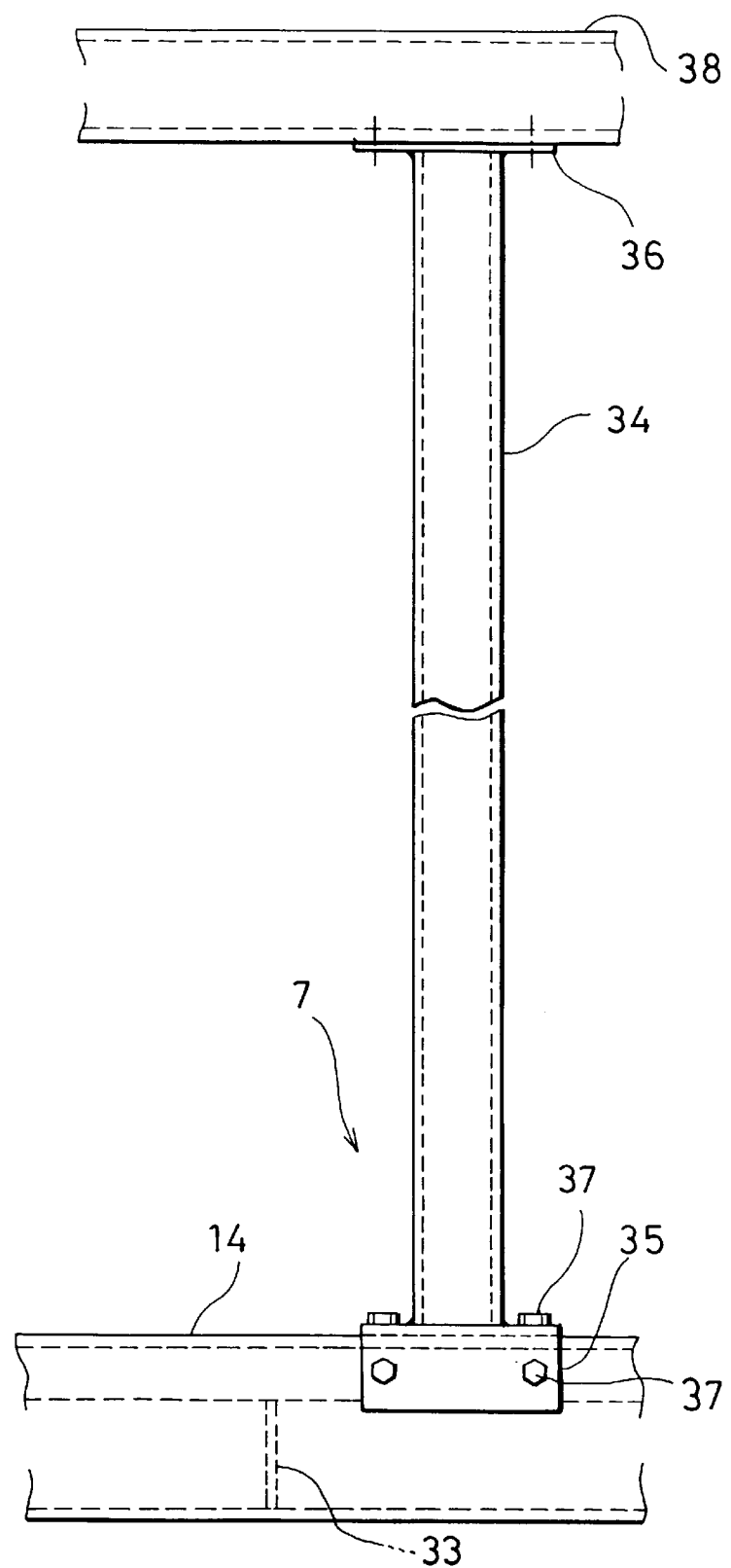
FIG. 4 is a partial front view showing relationship between the bed and the frame member in the present embodiment.
Figure 5:
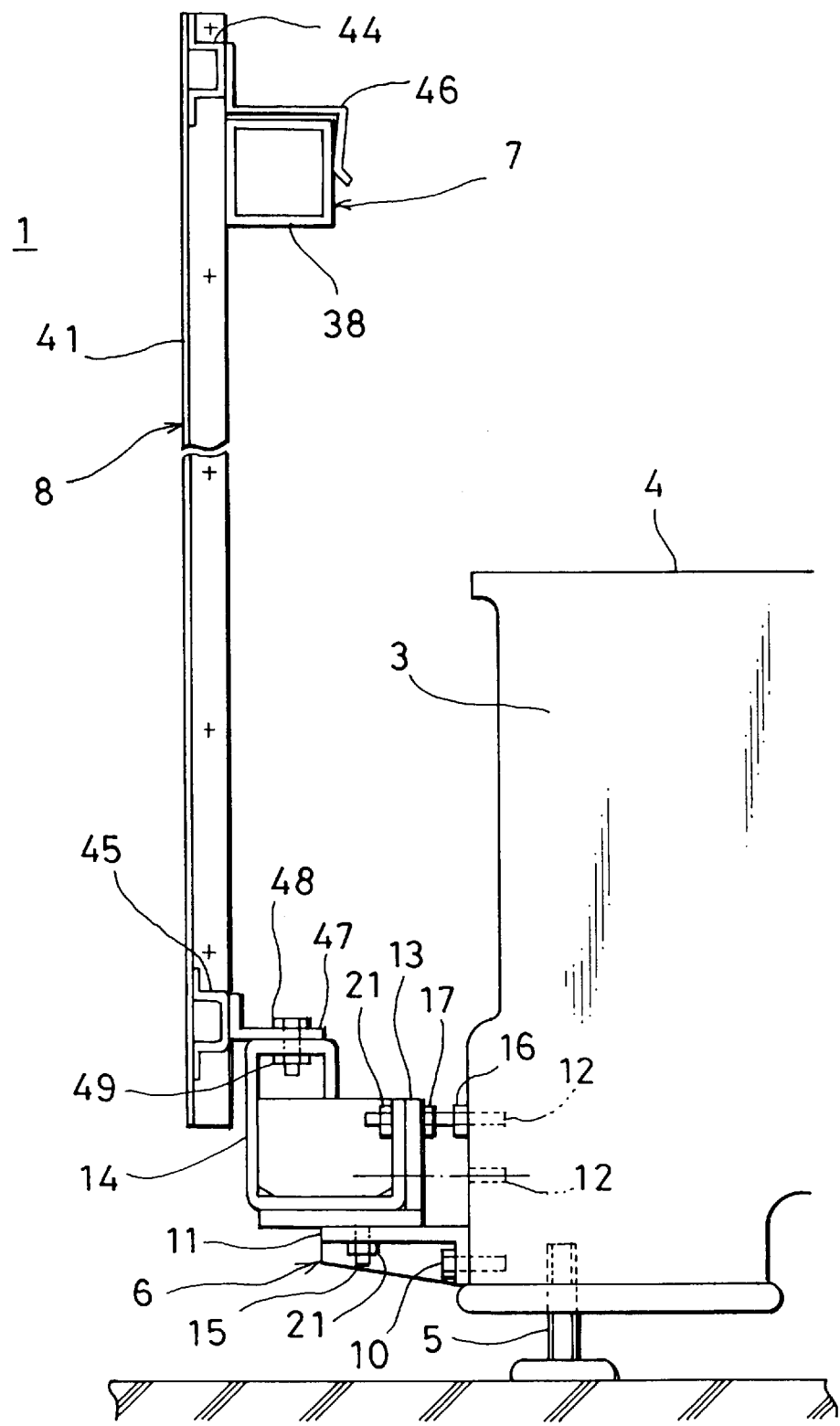
FIG. 5 is a partial side view showing relationship of the bed, the frame member and a panel in the present embodiment.
Figure 6:
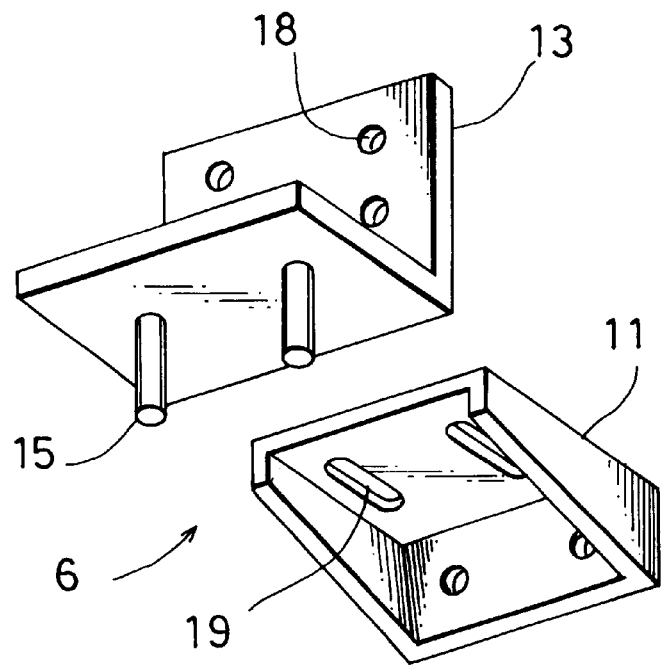
FIG. 6 is a perspective view as seen from under a frame member receptacle in the present embodiment.
Figure 7:
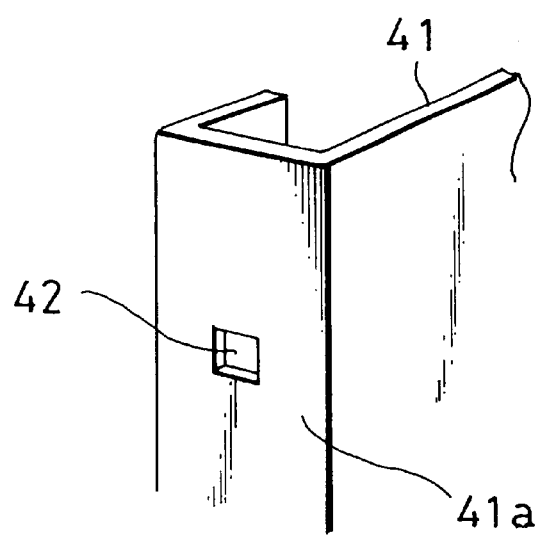
FIG. 7 is a partial perspective view of an end of a panel main member in the present embodiment.

In the above embodiment, a planar material is bent and used as the lower frame 14, and a drawn aluminum material or an extruded aluminum material may be used as shown in FIG. 10. In FIG. 10, the component with the same function as in FIG. 3 is referred by the same symbol.

The lower frame 14 has a rectangular cross-section. A groove is formed on the bottom surface, 2 grooves are formed on the surface facing to the bed 3, one groove is formed on the front surface, and one groove is formed on the upper surface. That is, convex grooves 50, 51, 51, 52, and 53 are formed on the surfaces. In each of these grooves 50, 51, 51, 52, and 53, a head of a bolt is slidably engaged as to be described later and turning of the bolt is controlled in each of the grooves 50, 51, 52 and 53.

The assembling by the lower frame 14 is performed as described below.

On a stud bolt 12 with a rectangular or hexagonal head, a fixing nut 16 and a positioning nut 17 are screwed in advance. Then, this is screwed into the bed 3, and horizontal positioning of the bolt head is performed. The distance between the positioning bolt 17 and the bolt head is set to such a value that there will be no trouble when the bolt head is engaged in the groove 51.

A bolt 15 is passed through an oblong hole 19 of the lower bracket 11. A nut is screwed in advance, and the distance between the nut and a head of the bolt 15 is set to such a value that there will be no problem when the head of the bolt 15 is engaged in the groove 50.

The head of the bolt 15 is engaged in the groove 50 on the lower frame 14, and the head of the stud bolt 12 is engaged in the groove 51. Then, the lower frame 14 is slid in a horizontal direction (perpendicularly to a paper surface in FIG. 10). Horizontal positioning of the lower frame 14 is performed, and the positioning nut 17 is tightened, and further the nut on the bolt 15 is tightened. For the lower frame 14, vertical positioning is performed by the lower bracket 11 and horizontal positioning is performed by the head of the stud bolt 12, and the lower frame is fixed on the bracket 11 and the bed 3.

To assemble the pillar 34 on the lower frame 14, a bolt 48 is mounted on the lower flange 35 in advance. With the bolt 48 screwed in the groove 52, the pillar 34 is slid in a horizontal direction. After positioning, the pillar 34 is fixed by a nut which had been screwed on the bolt 48 in advance.

As described above, by the use of the drawn material as the lower frame 14, the lower frame 14 can be manufactured in lightweight design and at lower cost. When the lower frame 14 is mounted by the bolt using the convex groove, allowance for adjustment is increased, and there is no need to fabricate a hole for inserting the bolt, and this contributes to the reduction of fabrication cost.

As described above, there are provided the frame member receptacle to be mounted on the bed of the manufacturing machine, the frame member to be disposed on the frame member receptacle, and the panel to be mounted on the frame member. This makes it possible to eliminate the working procedure to erect a column and the like on the floor surface where the manufacturing machine is to be installed. Also, it contributes to higher working efficiency, and there is no problem in the assembling even when the installing position of the manufacturing machine is changed.

A position of the frame member receptacle is adjusted in advance before the mounting of the frame member, and this reduces the troublesome task of the adjustment when the frame member is mounted.

The frame member receptacle can be transported under such condition that the frame member is mounted on the bed. Thus, it is possible to perform position adjustment at a factory and to reduce the working procedure for the adjustment at the installation site.

The frame member receptacle comprises a lower bracket positioned in a vertical direction and an upper bracket mounted on the lower bracket, and wherein the upper bracket has a horizontal surface where the frame member is placed and a vertical surface positioned in a horizontal direction with respect to the bed. In this respect, positioning adjustment in a vertical direction and a horizontal direction of the frame member can be performed in advance.

The pillar to constitute the frame member comprises a lower flange on a lower end and the lower flange has a vertical surface abutted and positioned to the lower frame, and this facilitates the positioning.

The panel comprises a hooked hardware to be engaged with the upper frame. This facilitates fixing procedure by supporting the panel on the upper frame when the panel is mounted. The panel is divided to a predetermined number of divided panel members, and the divided panel members can be connected by a square neck bolt. This reduces the load of the work, and one-man operation can be achieved.

Now, description will be given on the opening/closing device 2 referring to FIG. 11 to FIG. 17.

On both sides of the bed 3 facing to the opening/closing device 2, side pillars 55 and 56 are fixed via required components such as brackets (see FIG. 2).

A motor bracket 57 is mounted on the front surface of the side pillar 55, and a motor base 58 is erected on the motor bracket 57. An opening/closing motor 59 with a speed reducer is mounted on the motor base 58. The opening/closing motor 59 has a horizontal output shaft.

On the inner side of each of the side pillars 55 and 56, bearing bases 61 and 61 are fixed respectively, and bearings 62 and 62 are mounted on the bearing bases 61 and 61. A horizontal drive shaft 63 is rotatably supported by the bearings 62 and 62, and one end of the drive shaft 63 is connected to the output shaft of the opening/closing motor 59.

On each side of the drive shaft 63, a first driving sprocket wheel 64 and a second driving sprocket wheel 65 are fixed respectively. The first driving sprocket wheel 64 is arranged on the outer side with respect to the second driving sprocket wheel 65. A pitch circle of the first driving sprocket wheel 64 has twice as large diameter as a pitch circle of the second driving sprocket wheel 65.

On upper ends of the side pillars 55 and 56 and at positions facing to the bearings 62 and 62, a shaft support member 66 is fixed. A driven shaft 67 is supported as cantilever on each of the side pillars 55 and 56 via the shaft support member 66. A first driven sprocket wheel 68 and a second driven sprocket wheel 69 are arranged respectively on these two driven shafts 67.

The first driven sprocket wheel 68 is positioned at the outer side with respect to the second driven sprocket wheel 69. The first driven sprocket wheel 68 and the second driven sprocket wheel 69 are at positions facing to the first driving sprocket wheel 64 and the second driving sprocket wheel 65 respectively.

A lifting first chain 71 is run between the first driving sprocket wheel 64 and the first driven sprocket wheel 68, and one end is engaged with a lower end of a first opening/closing panel 72 and the other end is engaged with an upper end of the first opening/closing panel 72. A lifting second chain 73 is run between the second driving sprocket wheel 65 and the second driven sprocket wheel 69. One end is engaged with a lower end of the second opening/closing panel 74, and the other end is engaged with an upper end of the opening/closing panel 74. A dimension in a vertical direction of the first opening/closing panel 72 is identical with that of the second opening/closing panel 74.

The lifting first chain 71 is endlessly run between the first driving sprocket wheel 64 and the first driven sprocket wheel 68 via the first opening/closing panel 72. The lifting second chain 73 is endlessly run between the second driving sprocket wheel 65 and the second driven sprocket wheel 69. Each end of the first opening/closing panel 72 is supported by the lifting first chain 71, and each end of the second opening/closing panel 74 is supported by the lifting second chain 73 respectively.

Guide roller support pieces 75 are fixed at the upper and lower portions on end surface on each side of the first opening/closing panel 72. A guide roller 76 having a rotation shaft perpendicular to the first opening/closing panel 72 is rotatably mounted on each of the guide roller support piece 75. Guide roller support pieces 77 are fixed at the upper and lower portions on end surface on each side of the second opening/closing panel 74. A guide roller 78 having a rotation shaft perpendicular to the second opening/closing panel 74 is rotatably mounted on each of the guide roller support piece 77.

Guide rails 81 and 82 extending in a vertical direction are fixed on the inner side of the side pillar 55 and on the inner side of the side pillar 56 respectively. Each of the guide rails 81 and 82 has a U-shaped cross-section. One end is engaged with the guide roller 76 and the other end is engaged with the guide roller 78. The first opening/closing panel 72 is guided by the guide rails 81 and 82 via the guide roller 76 and can be moved up and down. The second opening/closing panel 74 is guided by the guide rails 81 and 82 via the guide roller 78 and can be moved up and down. With respect to relationship of an amount of lifting between the first opening/closing panel 72 and the second opening/closing panel 74, the amount of lifting of the first opening/closing panel 72 is twice as high as the amount of lifting of the second opening/closing panel 74.

Now, description will be given on an engaging portion of the lifting first chain 71 and the first opening/closing panel 72.

An L-shaped upper engaging piece 83 is fixed on the upper guide roller support piece 75. An upper chain engaging rod 84 is inserted into a horizontal surface of the upper engaging piece 83. At the lower end, a double nut is mounted so that the amount of projection can be adjusted and there will be no loosening. On the upper end of the chain engaging rod 84, one end of the lifting first chain 71 is engaged.

A lower engaging piece 85 is fixed on the lower guide roller support piece 75. A lower chain engaging rod 86 is inserted into a horizontal surface of the lower engaging piece 85. On upper end of the lower chain engaging rod 86, a double nut is mounted via a tension spring 87 so that the movement can be adjusted and there will be no loosening. The tension spring 87 gives an adequate tensile force to the lifting first chain 71 so that a motive force is transmitted from the first driving sprocket wheel 64 to the lifting first chain 71 without backlash and in a reliable manner.

The engaging portion of the lifting second chain 73 is the same as that of the lifting first chain 71, and detailed description is not given here.

Figure 16:
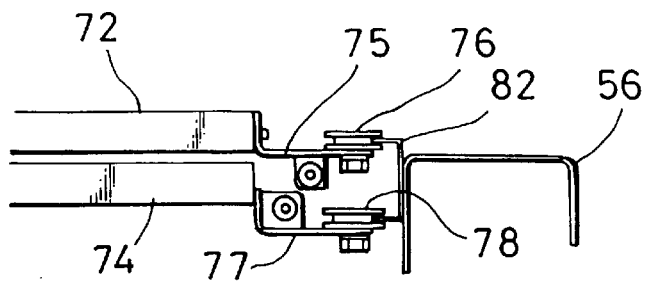
FIG. 16 is a partial plan view of the opening/closing panel end of the opening/closing device in the present embodiment.
Figure 17:
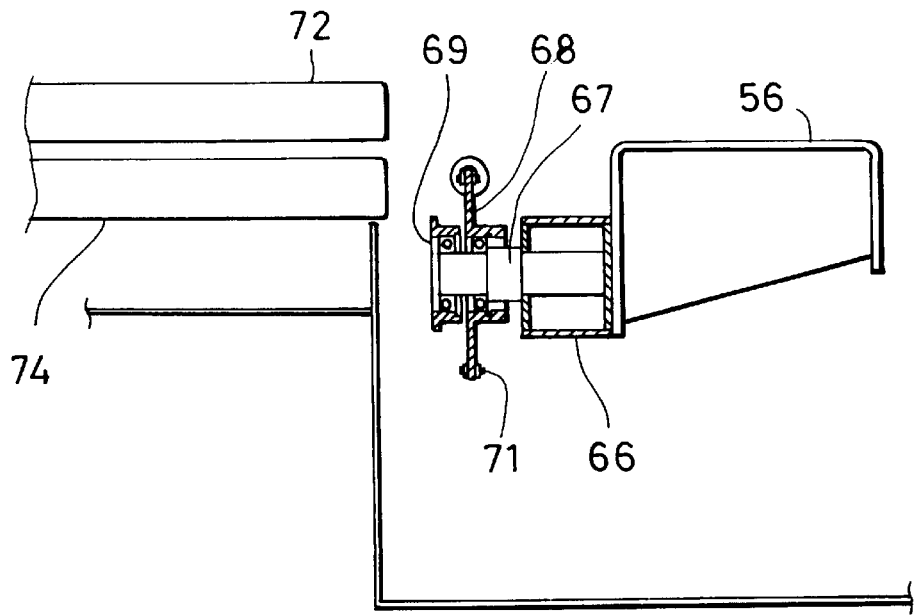
FIG. 17 is a plan view of an upper end of a pillar of the opening/closing device in the present embodiment.

The first driving sprocket wheel 64 has a diameter different from a diameter of the second driving sprocket wheel 65, and a diameter of the first driven sprocket wheel 68 is different from a diameter of the second driven sprocket wheel 69. Further, the position in the axial direction is also deviated. Thus, no interference occurs between the lifting first chain 71 and the first opening/closing panel 72. In particular, the diameters are different between the first driving sprocket wheel 64 and the second driving sprocket wheel 65. As a result, the engaging portions can be arranged at closer positions as shown in FIG. 16, and these can be accommodated in a relatively narrow space.

Although not shown specifically in the figures, a limit switch for upper limit and a limit switch for lower limit are provided on the side pillars 55 and 56 so that operation limits of the first opening/closing panel 72 and the second opening/closing panel 74 can be defined. Operating pieces to operate the limit switch for upper limit and the limit switch for lower limit are provided on the first opening/closing panel 72 and the second opening/closing panel 74 respectively. Alternately, a sensor (not shown) for detecting a deceleration starting position is provided to ensure smooth stopping operation.

To assure the safety when the first opening/closing panel 72 and the second opening/closing panel 74 are opened, a photoelectric switch (not shown) having an optical path over the side pillars 55 and 56 is provided. When the optical path of the photoelectric switch is interrupted, the manufacturing machine is stopped.

Figure 12:
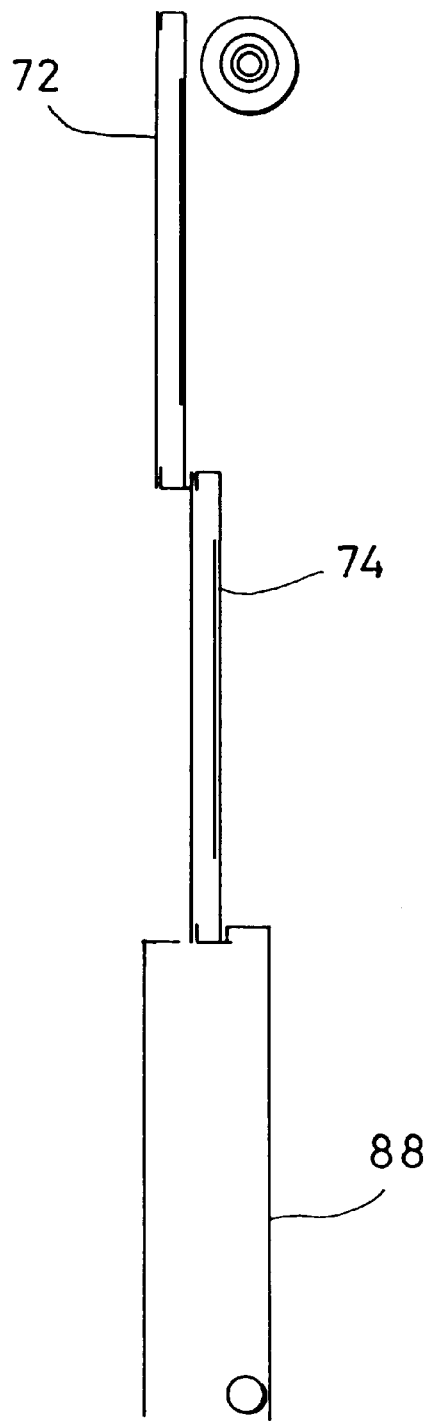
FIG. 12 is an arrow diagram along the line B in FIG. 11.
Figure 13:
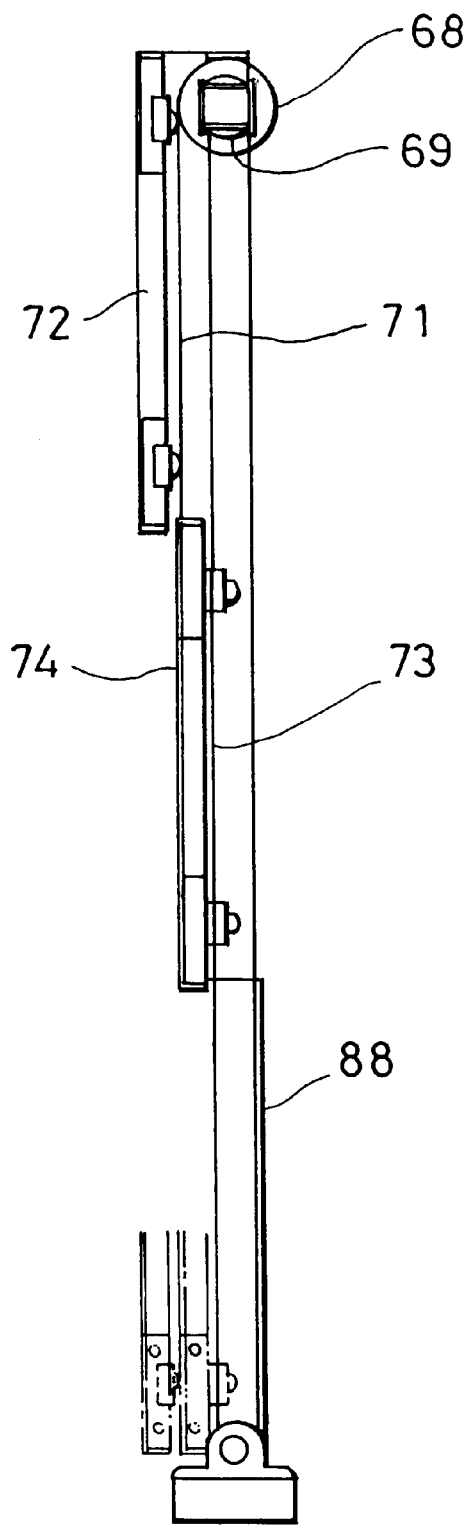
FIG. 13 is an arrow diagram along the line C in FIG. 11.
Figure 14:
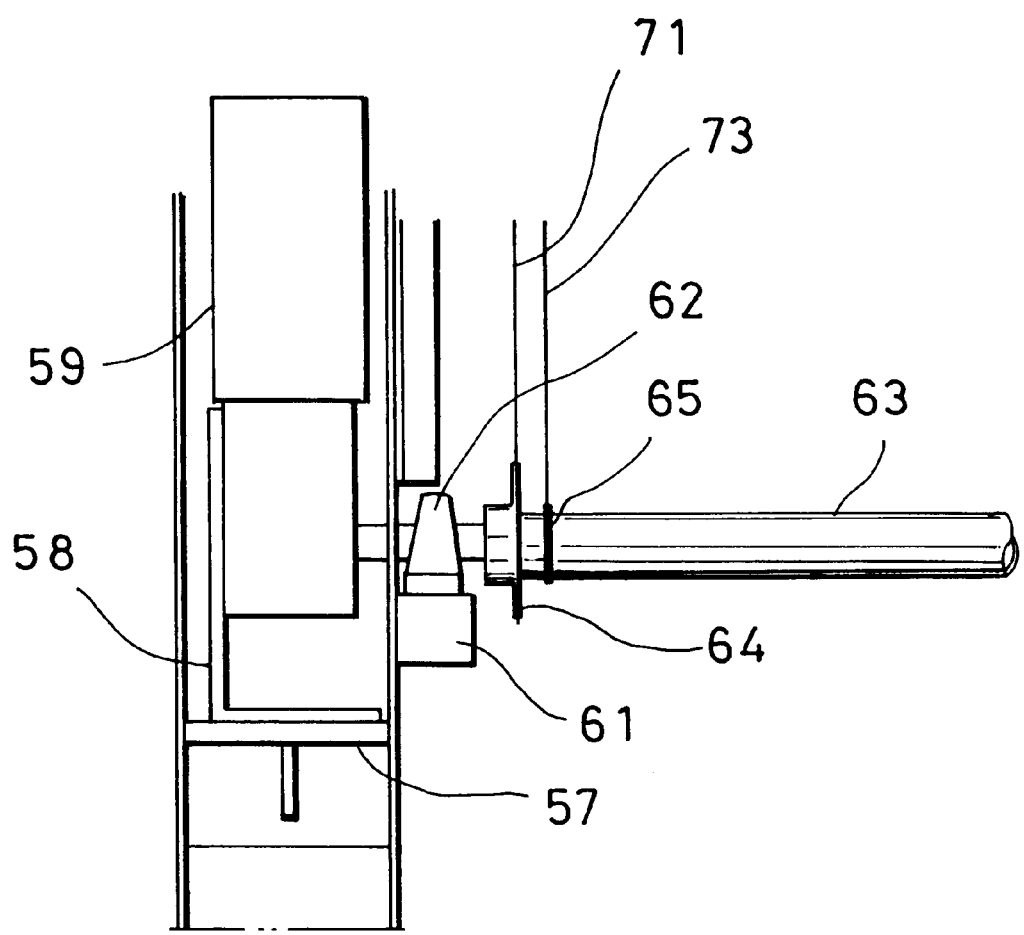
FIG. 14 is an enlarged view of a motor portion of the opening/closing device in the present embodiment.
Figure 15:
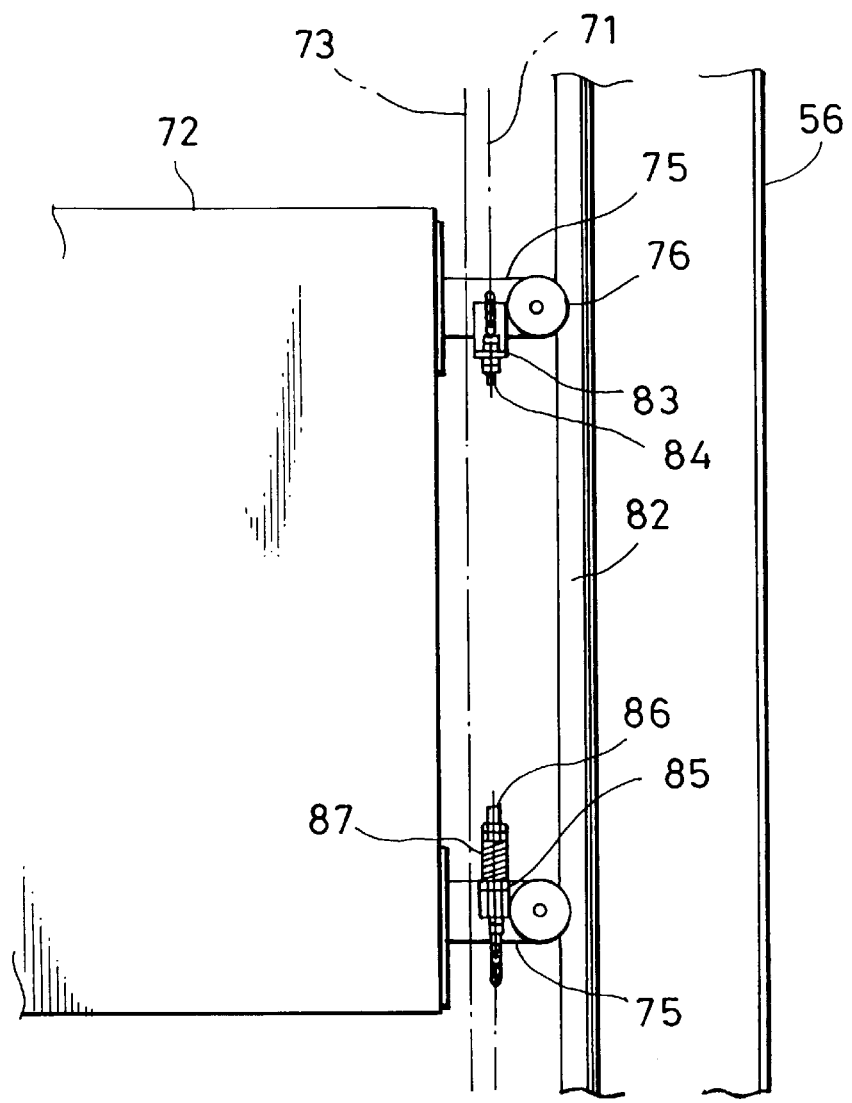
FIG. 15 is a partial front view of an opening/closing panel end of the opening/closing device in the present embodiment.

Further, the opening/closing device 2 comprises a door pocket panel 88 at the lower portion. When the first opening/closing panel 72 and the second opening/closing panel 74 are in an opened state (moved down to the lower position), the first opening/closing panel 72 and the second opening/closing panel 74 are accommodated in the door pocket panel 88 (FIG. 12).

In the following, description will be given on opening/closing operation of the opening/closing device 2.

From a condition where the first opening/closing panel 72 and the second opening/closing panel 74 are opened, the opening/closing motor 59 is driven, and the drive shaft 63 is rotated in a direction to close the panels. The lifting first chain 71 and the lifting second chain 73 are turned via the first driving sprocket wheel 64 and the second driving sprocket wheel 65. As a result, the first opening/closing panel 72 and the second opening/closing panel 74 are moved up.

The first driving sprocket wheel 64 has the diameter of the pitch circle twice as large as that of the second driving sprocket wheel 65. Therefore, lifting speed of the first opening/closing panel 72 is twice as high as that of the second opening/closing panel 74. The first driving sprocket wheel 64 and the second driving sprocket wheel 65 are provided on the same drive shaft 63, and these are rotated perfectly in synchronization. Therefore, the time to complete the closing operation of the first opening/closing panel 72 agrees with that of the second opening/closing panel 74. Thus, smooth opening and closing operation is ensured, and there is no waste in the time for opening and closing.

In the opening operation of the opening/closing device 2, the drive shaft 63 is rotated in a direction to open the panels by the opening/closing motor 59. In the opening operation, also, it is needless to say that the first opening/closing panel 72 and the second opening/closing panel 74 are operated in synchronization and that the opening time is the same.

As the system to control the opening/closing motor 59, inverter control is used. By the inverter control, opening/closing speed of the first opening/closing panel 72 and the second opening/closing panel 74 can be set to any speed as desired. Acceleration and deceleration can also be performed in a simple manner, and this contributes to simple and easily speed control.

Figure 18:
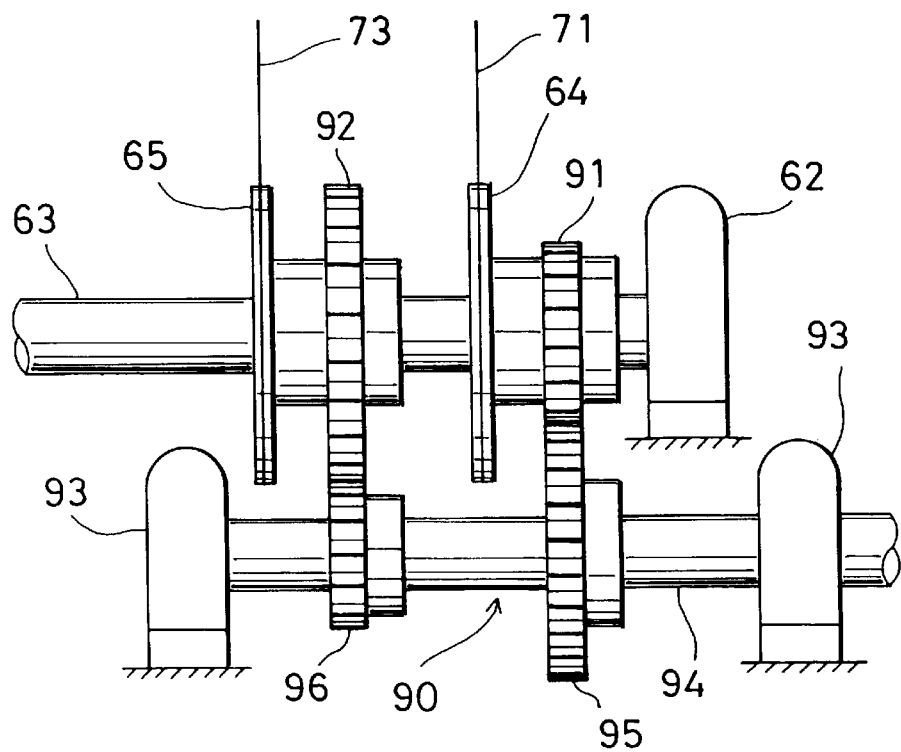
FIG. 18 is a drawing to explain another example of driving means in the opening/closing device in the present embodiment.

For a means for synchronously driving the first opening/closing panel 72 and the second opening/closing panel 74, it may be designed in such manner that the first driving sprocket wheel 64 and the second driving sprocket wheel 65 are fixed on the drive shaft 63 and the drive shaft 63 is directly driven. Or, the first driving sprocket wheel 64 and the second driving sprocket wheel 65 may be driven via a train of gears 90 as shown in FIG. 18.

That is, the first driving sprocket wheel 64 and the second driving sprocket wheel 65 are rotatably provided on the drive shaft 63. A first driven gear 91 is integrated with the first driving sprocket wheel 64, and a second driven gear 92 is integrated with the second driving sprocket wheel 65.

A front stage drive shaft 94 is rotatably mounted in parallel to the drive shaft 63 via a bearing 93, and a first driving gear 95 and a second driving gear 96 are fixed on the front stage drive shaft 94. The first driving gear 95 is engaged with the first driven gear 91, and the second driving gear 96 is engaged with the second driven gear 92. The front stage drive shaft 94 is rotated by the opening/closing motor 59. The first driving sprocket wheel 64 is rotated via the first driving gear 95 and the first driven gear 91, and the second driving sprocket wheel 65 is rotated via the second driving gear 96 and the second driven gear 92. In this case, a gear ratio of the first driven gear 91 to the first driving gear 95 and a gear ratio of the second driven gear 92 to the second driving gear 96 are selected in such manner that a circumferential speed ratio of pitch circles of the first driving sprocket wheel 64 to the second driving sprocket wheel 65 will be 1:2.

The driving means is not limited to those explained above. Any type of driving means may be used so far as the ratio of moving amount of the first opening/closing panel 72 and the second opening/closing panel 74 and the circumferential speed ratio of the pitch circles of the first driving sprocket wheel 64 and the second driving sprocket are the same. Therefore, it is not necessary that the height dimension of the first opening/closing panel 72 is identical with that of the second opening/closing panel 74.

Further, if there are 3 or more opening/closing panels, it may be designed in such manner that an opening/closing speed ratio corresponds to a ratio of the moving amounts for each panel. If we take an example in FIG. 11, in case there are 3 opening/closing panels, 3 driving sprocket wheels are mounted on the drive shaft 63, and a pitch circle ratio of the driving sprocket wheels is set to 1:2:3. Then, these three panels may be opened or closed via the chain respectively.

Any type of driving means may be used so far as it can be driven in synchronization. A timing belt may be used instead of the chain or opening and closing may be performed in a rack-and-pinion system.

Further, in case opening/closing area of the opening/closing device 2 is not big, one opening/closing panel may be used.

Further, a balance weight may be provided on the lifting first chain 71 and the lifting second chain 73 to keep balance with the first opening/closing panel 72 and the second opening/closing panel 74. Then, the load on the opening/closing motor 59 can be reduce, and a small capacity motor may be used.

In the opening/closing device 2 according to the present invention, there is no beam crossing the opening on the upper end of the opening. This facilitates transport and other operation of large-size materials to be manufactured.

The present invention provides an opening/closing device, comprising an opening disposed on a partitioning system, driving wheels mounted on each side of lower end of the opening, driven wheels mounted on each side of upper end of the opening, and flexible members to be run between the driving wheels and the driven wheels, wherein one end and the other end of each of the flexible members are engaged with an opening/closing panel respectively, the driving wheels on both sides are driven synchronously and the opening/closing panel is moved up and down. As a result, there is no need to arrange a guide rail running across the upper end of the opening, and the opening is perfectly opened.

The opening is opened or closed by a plurality of opening/closing panels, as many driving wheels as matching the number of the opening/closing panels are provided on each side of the drive shaft, driven wheels are disposed at positions facing to the driving wheels respectively, the opening/closing panels are moved up and down via the flexible members run between the driving wheels and the driven wheels, and each of the driving wheels is driven in such manner that a circumferential speed ratio of pitch circles of driving wheels is equalized with a ratio of amounts of moving up or down of the opening/closing panels. Therefore, the opening can be opened or closed quickly and smoothly.

What is claimed is:

1. An opening/closing device adapted to be secured to a partitioning system having an opening having an upper portion which is completely open, said device comprising side pillars adapted to be erected on each side of said opening, a guide rail provided on each of said side pillars, an opening/closing panel for opening and closing said opening by up and down movement along said guide rail, a drive shaft provided between lower portions of said side pillars, an opening/closing motor mounted on said lower portion of one of said side pillars, said opening/closing motor having an output shaft, driving wheels mounted on each side of said drive shaft, driven wheels mounted on each side of said upper portion of said opening, and flexible members extending between said driving wheels and said driven wheels, wherein one end and the other end of each of said flexible members are engaged with an opening/closing panel respectively, said output shaft of said opening/closing motor is connected to said drive shaft, the driving wheels on both sides are driven synchronously by driving said opening/closing motor and said opening/closing panel is moved up and down via said flexible members.

2. An opening/closing device according to claim 1, wherein said driving wheels and said driven wheels are sprocket wheels and said flexible members are chains.

3. An opening/closing device according to claim 2, wherein said driving wheel is fixed on said drive shaft, and said drive shaft is rotated by said opening/closing motor.

4. An opening/closing device according to claim 1, wherein one end of said flexible member is engaged with the opening/closing panel via a tension spring.

5. An opening/closing device according to claim 1, wherein said opening is opened or closed by a plurality of opening/closing panels, as many driving wheels to match the number of said opening/closing panels are provided on each side of the drive shaft, driven wheels are disposed at positions facing said driving wheels respectively, said opening/closing panels are moved up and down via said flexible members extending between said driving wheels and said driven wheels, and each of said driving wheels is driven in such a manner that a circumferential speed ratio between pitch circles of said driving wheels is equalized with the ratio of the amount said opening/closing panels move up and down.

6. An opening/closing device according to claim 5, wherein a pitch circle of each of the driving wheels and the driven wheels is changed for each opening/closing panel so that said flexible members do not interfere with each other.

7. An opening/closing device according to claim 1, wherein each of said side pillars has an inner side, and said guide rail is provided on said inner side of each of said side pillars, and the opening/closing panel is moved up and down along said guide rail via guide rollers.

* * * * *